US010887827B2

(12) United States Patent
Yu et al.

(10) Patent No.: US 10,887,827 B2
(45) Date of Patent: Jan. 5, 2021

(54) COMMUNICATION MESSAGE SENDING METHOD AND APPARATUS BASED ON BACKOFF DURATION

(71) Applicant: Huawei Technologies Co., Ltd., Guangdong (CN)

(72) Inventors: Feng Yu, Beijing (CN); Baokun Shan, Beijing (CN); Guangwei Yu, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 16/145,567

(22) Filed: Sep. 28, 2018

(65) Prior Publication Data
US 2019/0037478 A1 Jan. 31, 2019

Related U.S. Application Data

(63) Continuation of application No. PCT/CN2016/078402, filed on Apr. 1, 2016.

(51) Int. Cl.
*H04W 72/04* (2009.01)
*H04W 48/14* (2009.01)
(Continued)

(52) U.S. Cl.
CPC ....... *H04W 48/14* (2013.01); *H04W 72/1289* (2013.01); *H04W 74/085* (2013.01); *H04W 76/18* (2018.02); *H04W 74/008* (2013.01)

(58) Field of Classification Search
CPC . H04W 48/12; H04W 74/085; H04W 74/008; H04W 76/18; H04W 72/1289
See application file for complete search history.

(56) References Cited

U.S. PATENT DOCUMENTS 10,098,156 B2 * 10/2018 Hwang ............... H04W 4/70
2004/0032877 A1 * 2/2004 Chuah ............. H04W 74/0875
370/444
(Continued)

FOREIGN PATENT DOCUMENTS

CN 102291846 A 12/2011
CN 102387538 A 3/2012
(Continued)

OTHER PUBLICATIONS

ZTE, "Discussion on RAR and Paging for MTC enhancement", 3GPP TSG RAN WG1 Meeting #81, Fukuoka, Japan, May 25-29, 2015, 5 pages, R1-152963.
(Continued)

*Primary Examiner* — Hassan Kizou
*Assistant Examiner* — Mahbubul Bar Chowdhury
(74) *Attorney, Agent, or Firm* — Fish & Richardson P.C.

(57) ABSTRACT

Example communication message sending methods and apparatus based on backoff duration are described. One example method includes that a terminal device sends an access request to a cell to which the terminal device belongs. The terminal device monitors a downlink control channel, and receives an access response message based on scheduling information on the downlink control channel. If the access response message carries a backoff access identifier, the terminal device determines a backoff parameter corresponding to the backoff access identifier in the access response message based on a correspondence that is pre-stored and that is between the backoff access identifier and the backoff parameter. The terminal device determines backoff duration based on the backoff parameter and an access resource interval period corresponding to the terminal device, and sends an access request to the cell after the backoff duration.

14 Claims, 8 Drawing Sheets

(51) Int. Cl.
*H04W 74/08* (2009.01)
*H04W 76/18* (2018.01)
*H04W 72/12* (2009.01)
*H04W 74/00* (2009.01)

(56) References Cited

U.S. PATENT DOCUMENTS

| | | | |
|---|---|---|---|
| 2004/0160977 A1* | 8/2004 | Dick | H04W 74/006 370/448 |
| 2012/0020322 A1* | 1/2012 | Fan | H04W 72/0453 370/330 |
| 2012/0033613 A1* | 2/2012 | Lin | H04W 74/085 370/328 |
| 2012/0051297 A1* | 3/2012 | Lee | H04W 74/006 370/329 |
| 2012/0196608 A1 | 8/2012 | Ting et al. | |
| 2013/0034059 A1* | 2/2013 | Lee | H04W 4/70 370/328 |
| 2013/0053075 A1* | 2/2013 | Yoshizawa | H04W 74/085 455/500 |
| 2013/0235720 A1* | 9/2013 | Wang | H04W 28/0278 370/229 |
| 2013/0272229 A1* | 10/2013 | Dinan | H04W 52/367 370/329 |
| 2015/0009879 A1 | 1/2015 | Kim et al. | |
| 2015/0195855 A1 | 7/2015 | Liu et al. | |
| 2016/0337869 A1 | 11/2016 | Dai et al. | |
| 2017/0290064 A1 | 10/2017 | Liu et al. | |
| 2018/0115922 A1 | 4/2018 | Wang et al. | |

FOREIGN PATENT DOCUMENTS

| | | | |
|---|---|---|---|
| CN | 102883461 A | | 1/2013 |
| CN | 104115542 A | | 10/2014 |
| CN | 104160756 A | | 11/2014 |
| CN | 102387538 B | * | 6/2015 |
| CN | 105103584 B | | 11/2015 |
| CN | 105451360 A | | 3/2016 |
| WO | 2014/065593 A1 | | 5/2014 |
| WO | 2016/045532 A1 | | 3/2016 |
| WO | 2016145662 A1 | | 9/2016 |

OTHER PUBLICATIONS

ASUSTeK, " Consideration on random access for further MTC enhancement", 3GPP TSG-RAN WG2 Meeting #91, Beijing, China, Aug. 24-28, 2015, 6 pages, R2-153486.

Office Action issued in Chinese Application No. 201680079493.X dated Nov. 13, 2019, 20 pages (with English translation).

R1-153486—Ericsson, "Summary of the Coexistence Evaluation Results for DL-only LAA and DL-only Wi-Fi," 3GPP TSG RAN WG1 Meeting #81, Fukuoka, Japan, May 25-29, 2015, 122 pages.

* cited by examiner

COMMUNICATION MESSAGE SENDING METHOD AND APPARATUS BASED ON BACKOFF DURATION

CROSS-REFERENCE TO RELATED APPLICATIONS

This application is a continuation of International Application No. PCT/CN2016/078402, filed on Apr. 1, 2016, the disclosure of which is hereby incorporated by reference in its entirety.

TECHNICAL FIELD

The present application relates to the field of Internet technologies, and in particular, to a communication message sending method and an apparatus.

BACKGROUND

Mobile communication has greatly changed people's life, but people are still in pursuit of mobile communication with better performance. To cope with explosive growth of mobile data traffic, mass device connections, and various newly-emerging services and application scenarios in the future, the 5G system will emerge as the times require. The Internet of Things is an important part of the 5G, and the market requirements for the Internet of Things are rapidly increasing. Currently, the 3GPP standard focuses on bearing an Internet of Things (IoT) service based on a cellular network, by designing a new air-interface, and by making full use of features of a narrowband technology. This type of IoT is referred to as the NB-IoT. Compared with a conventional cellular network, a service and a terminal device of the NB-IoT network have the following features: a low rate for a service, a long period, mass connections, low costs, low power consumption, and the like.

In the Long Term Evolution (LTE) system, a terminal establishes a connection to a network by using a random access (RA) process at a Media Access Control (MAC) layer. The terminal may send a preamble sequence (which may be referred to as a preamble) to a base station when a preset resource period is reached, so as to indicate, to the base station, that the terminal needs to access the network. In this case, if the base station needs to delay access from the terminal for some reasons (for example, network overload), a BI (backoff indicator) may be carried in an RAR (random access response). The terminal may pre-store a correspondence table between the BI and backoff duration, search the correspondence table for backoff duration corresponding to the received BI, and then re-send a preamble when the backoff duration is reached.

In a process of implementing the present application, the inventor finds that the prior art has at least the following problem:

Different terminals may have different resource periods. In this case, it is hard to use a unified correspondence table between the BI and the backoff duration to control backoff access from each terminal. This causes a relatively poor flexibility of load control. For example, a resource period of a terminal A is 10 ms (that is, one sending opportunity arises every 10 ms), a resource period of a terminal B is 400 ms (that is, one sending opportunity arises every 400 ms), and maximum backoff duration is 320 ms. A quantity of maximum backoff sending opportunities of the terminal A varies between 0 to 32. However, for the terminal B, maximum backoff duration is 320 ms<400 ms. Therefore, processing of the terminal B after the control access is the same as the processing before the control access, and a function of controlling access from the terminal B cannot be implemented.

SUMMARY

To implement that a terminal device effectively controls backoff access from each terminal in a process of performing backoff processing to improve flexibility of load control, embodiments of the present application provide a communication message sending method and an apparatus. The technical solutions are as follows:

According to a first aspect, a communication message sending method is provided, and the method includes:

sending, by a terminal device, an access request to a cell to which the terminal device belongs;

listening to, by the terminal device, a downlink control channel, and receiving, based on scheduling information on the downlink control channel, an access response message;

if the access response message carries a backoff access identifier, determining, by the terminal device based on a correspondence that is pre-stored and that is between the backoff access identifier and a backoff parameter, the backoff parameter corresponding to the backoff access identifier in the access response message;

determining, by the terminal device, backoff duration based on the backoff parameter and an access resource interval period corresponding to the terminal device; and re-sending, by the terminal device, an access request to the cell after the backoff duration.

The resource interval period may indicate a minimum time interval of an access resource that is available for the terminal device to send the access requests twice on the access channel, that is, a sending period used by the terminal device to send the access request. The backoff parameter may be a multiple of the access resource interval period.

The terminal may search the pre-stored correspondence between the backoff access identifier and the backoff parameter for the backoff parameter corresponding to the received backoff access identifier, and then may multiply the backoff parameter by the resource interval period corresponding to the terminal device to obtain the backoff duration of the terminal device.

With reference to the first aspect, in a first possible implementation of the first aspect, before the determining, by the terminal device based on the backoff parameter and an access resource interval period corresponding to the terminal device, backoff duration, the method further includes:

determining, by the terminal device based on a coverage degree of the cell on the terminal device, a coverage range level of the terminal device, and determining an access resource interval period that is on an access channel of the cell and that is corresponding to the coverage range level of the terminal device; where the access resource interval period indicates a minimum time interval of an access resource that is available for the terminal device to send the access requests twice on the access channel; and correspondence information between the coverage range level and the access resource interval period is included in a system message indicating physical channel resource configuration in the cell, and is sent by the cell to the terminal device.

The cell (for example, a cellular cell) may send, in a form of broadcast, the system message indicating the physical channel resource configuration to the terminal device. The system message may carry the correspondence information between the coverage range level and the access resource interval period. The terminal device may detect the coverage degree of the cell on the terminal device, determine the coverage range level of the terminal device based on the coverage degree, and search the foregoing correspondence for the access resource interval period corresponding to the coverage range level of the terminal device.

With reference to the first aspect or the first possible implementation of the first aspect, in a second possible implementation of the first aspect, a specific manner of the determining, by the terminal device based on the backoff parameter and the access resource interval period, backoff duration is:

Backoff_Time=[0,Backoff_Value]*$Period_{CEL}$, where

Backoff_Time represents the backoff duration, any value selected from [0, Backoff_Value] is the backoff parameter, and $Period_{CEL}$ represents the access resource interval period corresponding to the coverage range level of the terminal device.

According to a second aspect, a communication message sending method is provided, and the method includes:

sending, by a terminal device, a communication message to a cell to which the terminal device belongs;

if the terminal device does not receive, in preset duration after the communication message is sent, a response message sent by the cell, or the terminal device receives a response message that carries a backoff transmission identifier and that is sent by the cell, obtaining, by the terminal device, a backoff parameter, and determining, based on the backoff parameter and a basic backoff timeslot corresponding to the terminal device, backoff duration; and re-sending, by the terminal device, an access request to the cell after the backoff duration.

The basic backoff timeslot indicates a minimum duration unit when the terminal device performs backoff. For a channel that is distinguished by using frequency domain, a length of the basic backoff timeslot may be an integer quantity of basic timeslots of transmission duration of a typical data packet. For a channel that is distinguished by using time domain, the basic backoff timeslot may be an emergence period of a channel corresponding to each coverage range level or MCS (Modulation and Coding Schemes, modulation and coding scheme) in time domain.

The backoff parameter may be a multiple of the basic backoff timeslot. The terminal device may store a backoff window, and the backoff window may also be referred to as a contention window. The backoff window may be a value range, and each value included in the value range may be used as the backoff parameter. The backoff parameter may be a multiple of the basic backoff timeslot. The terminal device may generate a positive integer N that is not greater than the backoff window. The backoff window may be equal to a backoff initial window, or may be equal to a product obtained by multiplying the backoff initial window by a quantity of times of sending a data packet. Backoff initial windows corresponding to different MCSs or different coverage range levels may be the same, or may be different. If backoff initial windows corresponding to coverage range levels are different, the foregoing system message may carry a correspondence between the coverage range level and the backoff initial window. The terminal device may randomly select a value in the backoff window as the backoff parameter.

With reference to the second aspect, in a first possible implementation of the second aspect, before the determining, based on the backoff parameter and a basic backoff timeslot corresponding to the terminal device, backoff duration, the method further includes:

determining, by the terminal device based on a correspondence that is pre-stored and that is between each channel and the basic backoff timeslot, a basic backoff timeslot corresponding to a to-be-used first channel; where the basic backoff timeslot indicates a minimum duration unit when the terminal device performs backoff.

The base station may send, in a form of broadcast, the system message to the terminal device. The system message may carry a correspondence between each channel and the MCS and a backoff parameter on each channel. The backoff parameter may be a multiple of the basic backoff timeslot. In addition, the system message may include a basic backoff timeslot corresponding to each MCS, retransmission times of each data packet, and the like. Alternatively, the system message may carry a correspondence between the coverage range level and the basic backoff timeslot. The terminal device may determine a coverage range level corresponding to the terminal device, and use a basic backoff timeslot corresponding to the coverage range level as a basic backoff timeslot of the terminal device.

For any channel, if the channel is corresponding to one MCS, a basic backoff timeslot of the MCS is used as a basic backoff timeslot corresponding to the channel; or if the channel is corresponding to a plurality of MCSs, a maximum basic backoff timeslot of basic backoff timeslots corresponding to the plurality of MCSs is used as the basic backoff timeslot corresponding to the channel.

With reference to the second aspect or the first possible implementation of the second aspect, in a second possible implementation of the second aspect, a specific manner of the determining, based on the backoff parameter and a basic backoff timeslot corresponding to the terminal device, backoff duration is:

Backoff_Time=[0,CW_CH]*basic backoff timeslot, where

Backoff_Time represents the backoff duration, any value selected from [0, CW_CH] is the backoff parameter, and the basic backoff timeslot represents the basic backoff timeslot corresponding to the to-be-used first channel.

According to a third aspect, a terminal device is provided, where the terminal device includes a transceiver, a processor, and a memory, where:

the transceiver is configured to send an access request to a cell to which the transceiver belongs;

the processor is configured to: listen to a downlink control channel, and control, based on scheduling information on the downlink control channel, the transceiver to receive an access response message;

the processor is configured to: if the access response message carries a backoff access identifier, determine, based on a correspondence that is pre-stored in the memory and that is between the backoff access identifier and a backoff parameter, the backoff parameter corresponding to the backoff access identifier in the access response message;

the processor is configured to determine backoff duration based on the backoff parameter and an access resource interval period corresponding to the terminal device; and the transceiver is configured to re-send an access request to the cell after the backoff duration.

With reference to the third aspect, in a first possible implementation of the third aspect, the processor is further configured to:

before determining the backoff duration based on the backoff parameter and the access resource interval period corresponding to the terminal device, determine, based on a coverage degree of the cell on the terminal device, a coverage range level of the terminal device, and determine an access resource interval period that is on an access channel of the cell and that is corresponding to the coverage range level of the terminal device; where the access resource interval period indicates a minimum time interval of an access resource that is available for the terminal device to send the access requests twice on the access channel; and correspondence information between the coverage range level and the access resource interval period is included in a system message indicating physical channel resource configuration in the cell, and is sent by the cell to the terminal device.

With reference to the third aspect or the first possible implementation of the third aspect, in a second possible implementation of the third aspect, the processor is specifically configured to:

$$\text{Backoff\_Time}=[0,\text{Backoff\_Value}]*\text{Period}_{CEL}, \text{ where}$$

Backoff_Time represents the backoff duration, any value selected from [0, Backoff_Value] is the backoff parameter, and $\text{Period}_{CEL}$ represents the access resource interval period corresponding to the coverage range level of the terminal device.

According to a fourth aspect, a terminal device is provided, where the terminal device includes a transceiver and a processor, where:

the transceiver is configured to send a communication message to a cell to which the transceiver belongs;

the processor is configured to: if the transceiver does not receive, in preset duration after the communication message is sent, a response message sent by the cell, or the transceiver receives a response message that carries a backoff transmission identifier and that is sent by the cell, obtain a backoff parameter, and determine, based on the backoff parameter and a basic backoff timeslot corresponding to the terminal device, backoff duration; and the transceiver is configured to re-send an access request to the cell after the backoff duration.

With reference to the fourth aspect, in a first possible implementation of the fourth aspect, the terminal device further includes a memory, and the processor is further configured to:

before the determining, based on the backoff parameter and a basic backoff timeslot corresponding to the terminal device, backoff duration, determine, based on a correspondence that is pre-stored in the memory and that is between each channel and the basic backoff timeslot, a basic backoff timeslot corresponding to a to-be-used first channel; where the basic backoff timeslot indicates a minimum duration unit when the terminal device pier forms backoff.

With reference to the fourth aspect or the first possible implementation of the fourth aspect, in a second possible implementation of the fourth aspect, the processor is specifically configured to:

$$\text{Backoff\_Time}=[0,CW\_CH]*\text{basic backoff timeslot}, \text{ where}$$

Backoff_Time represents the backoff duration, any value selected from [0, CW_CH] is the backoff parameter, and the basic backoff timeslot represents the basic backoff timeslot corresponding to the to-be-used first channel.

According to a fifth aspect, a terminal device is provided, where the terminal device includes:

a transceiver module, which may be specifically implemented by a transceiver, configured to send an access request to a cell to which the transceiver module belongs;

a listening module, which may be specifically implemented by a processor, configured to: listen to a downlink control channel, and control, based on scheduling information on the downlink control channel, the transceiver module to receive an access response message; and a determining module, which may be specifically implemented by a processor, configured to: if the access response message carries a backoff access identifier, determine, based on a correspondence that is pre-stored in the memory and that is between the backoff access identifier and a backoff parameter, the backoff parameter corresponding to the backoff access identifier in the access response message; where the determining module, which may be specifically implemented by a processor, is further configured to determine backoff duration based on the backoff parameter and an access resource interval period corresponding to the terminal device; and the transceiver module, which may be specifically implemented by a transceiver, is further configured to re-send an access request to the cell after the backoff duration.

With reference to the fifth aspect, in a first possible implementation of the fifth aspect, the determining module is further configured to:

before determining the backoff duration based on the backoff parameter and the access resource interval period corresponding to the terminal device, determine, based on a coverage degree of the cell on the terminal device, a coverage range level of the terminal device, and determine an access resource interval period that is on an access channel of the cell and that is corresponding to the coverage range level of the terminal device; where the access resource interval period indicates a minimum time interval of an access resource that is available for the terminal device to send the access requests twice on the access channel; and correspondence information between the coverage range level and the access resource interval period is included in a system message indicating physical channel resource configuration in the cell, and is sent by the cell to the terminal device.

With reference to the fifth aspect or the first possible implementation of the fifth aspect, in a second possible implementation of the fifth aspect, the determining module is specifically configured to:

$$\text{Backoff\_Time}=[0,\text{Backoff\_Value}]*\text{Period}_{CEL}, \text{ where}$$

Backoff_Time represents the backoff duration, any value selected from [0, Backoff_Value] is the backoff parameter, and $\text{Period}_{CEL}$ represents the access resource interval period corresponding to the coverage range level of the terminal device.

According to a sixth aspect, a terminal device is provided, where the terminal device includes:

a transceiver module, which may be specifically implemented by a transceiver, configured to send a communication message to a cell to which the transceiver module belongs; and a determining module, which may be specifically implemented by a processor, configured to: if the transceiver module does not receive, in preset duration after the communication message is sent, a response message sent by the cell, or the transceiver receives a response message that carries a backoff transmission identifier and that is sent by the cell, obtain a backoff parameter, and determine, based on the backoff parameter and a basic backoff timeslot corresponding to the terminal device, backoff duration; where the transceiver module, which may be specifically implemented by a transceiver, is further configured to re-send an access request to the cell after the backoff duration.

With reference to the sixth aspect, in a first possible implementation of the sixth aspect, the determining module is further configured to:

before the determining, based on the backoff parameter and a basic backoff timeslot corresponding to the terminal device, backoff duration, determine, based on a correspondence that is pre-stored in the memory and that is between each channel and the basic backoff timeslot, a basic backoff timeslot corresponding to a to-be-used first channel; where the basic backoff timeslot indicates a minimum duration unit when the terminal device pier forms backoff.

With reference to the sixth aspect or the first possible implementation of the sixth aspect, in a second possible implementation of the sixth aspect, the determining module is specifically configured to:

Backoff_Time=[0,$CW\_CH$]*basic backoff timeslot, where

Backoff_Time represents the backoff duration, any value selected from [0, $CW\_CH$] is the backoff parameter, and the basic backoff timeslot represents the basic backoff timeslot corresponding to the to-be-used first channel.

The technical solutions provided in the embodiments of the present application bring the following beneficial effects:

In this embodiment of the present application, the terminal device sends an access request to a cell to which the terminal device belongs; the terminal device listens to a downlink control channel, and receives, based on scheduling information on the downlink control channel, an access response message; if the access response message carries a backoff access identifier, the terminal device determines, based on a correspondence that is pre-stored and that is between the backoff access identifier and a backoff parameter, the backoff parameter corresponding to the backoff access identifier in the access response message; the terminal device determines, based on the backoff parameter and an access resource interval period corresponding to the terminal device, backoff duration; and the terminal device re-sends an access request to the cell after the backoff duration. In this way, the backoff duration may be determined based on the access resource interval period corresponding to the terminal device, and backoff access from each terminal may be effectively controlled, thereby improving flexibility of load control.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DESCRIPTION OF EMBODIMENTS

To make the objectives, technical solutions, and advantages of the present application clearer, the following further describes the embodiments of the present application in detail with reference to the accompanying drawings.

Figure 1:
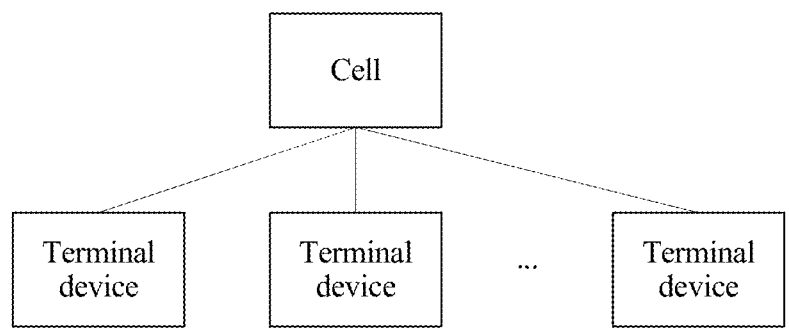
FIG. 1 is a block diagram of a system according to an embodiment of the present application.
Figure 2:
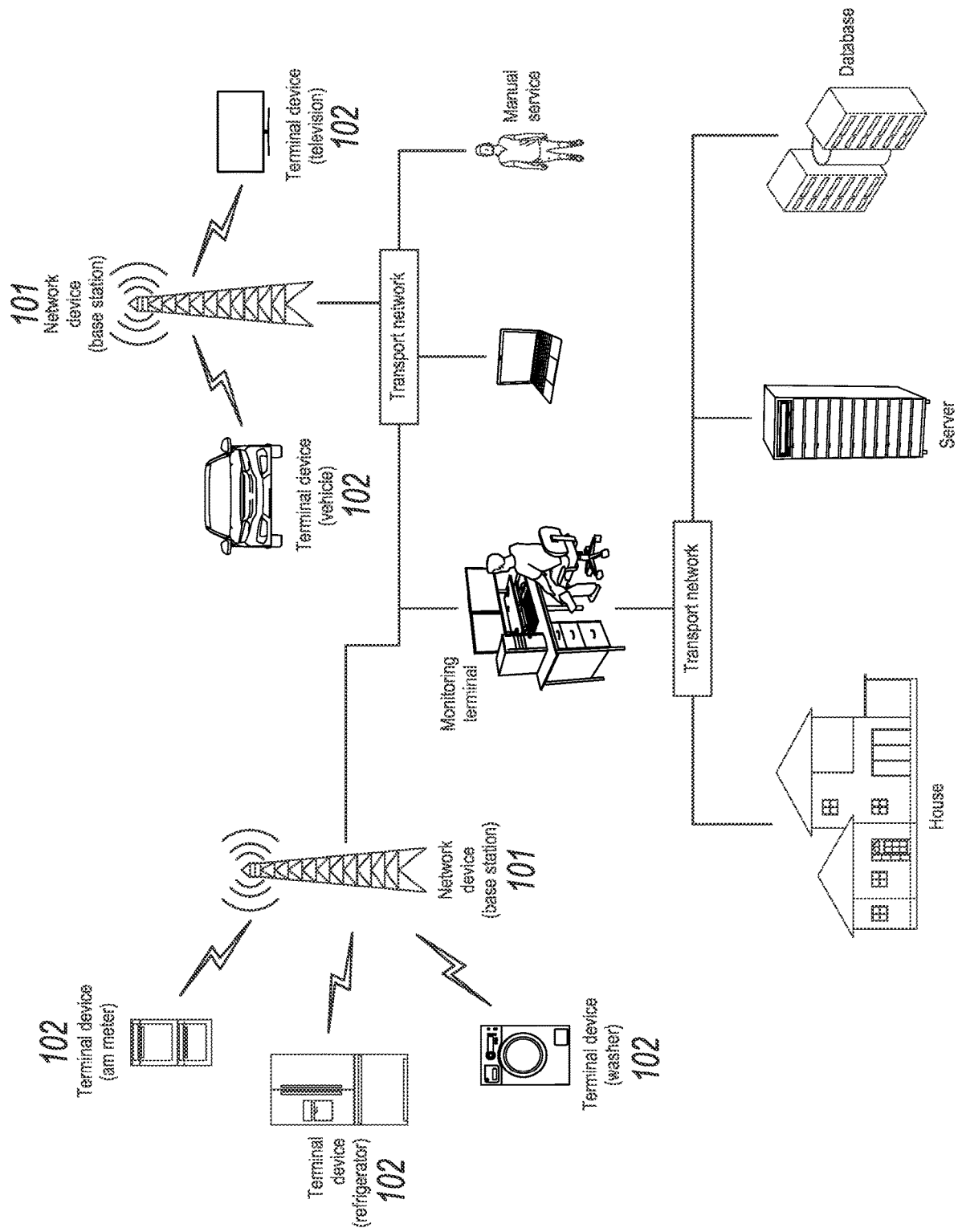
FIG. 2 is a flowchart of a communication message sending method according to an embodiment of the present application.

FIG. 1 shows a wireless communications system provided in this application. An architecture of the wireless communications system is applicable to all embodiments of this application. The method provided in this embodiment may be applied to a licensed spectrum in the wireless communications system such as the NB-IoT system. As shown in FIG. 2, FIG. 2 is a block diagram of a system according to an embodiment of the present application. The wireless communications system may include: a network device 101 and at least one terminal device 102. The NB-IoT system may be widely applied in a plurality of fields, including intelligent traffic, a building automation system, a home intelligent control system, a video surveillance system, industrial monitoring, and the like. As shown in FIG. 2, a refrigerator, an ammeter, a vehicle, and the like may be used as the terminal device 102 in the NB-IoT system, and communicate with other terminal devices by using a base station, a transport network, or the like (which are used as the network device 101 in the NB-IoT system), for example, communication between the ammeter and the vehicle.

The network device 101 may include a base station or a radio resource management device configured to control the base station, or include the base station and the radio resource management device configured to control the base station. The base station may be a macro base station or a micro base station such as a small cell and a pico cell; the base station may also be a home base station such as an home NodeB (HNB) and an home eNodeB (HeNB); and the base station may also include a relay node (relay) and the like.

For example, for an LTE system such as a TDD LTE system, an FDD LTE system, or an LTE-A system, in the wireless communications system provided in this embodiment of the present application, the network device 101 may be an evolved NodeB (eNodeB), and the terminal device 102 may be UE. For a TD-SCDMA system or a WCDMA system, in the wireless communications system provided in this embodiment of the present application, the network device 101 may include a NodeB (NodeB) and/or an radio network controller (RNC), and the terminal device 102 may be UE. For a GSM system, in the wireless communications system provided in this embodiment of the present application, the network device 101 may include a base transceiver station (BTS) and/or a base station controller (BSC), and the terminal device 102 is a mobile station (MS). For a Wi-Fi system, the network device 101 may include an access point (AP) and/or an access controller (AC), and the terminal device 102 may be a STA (station).

A communications standard of the wireless communications system provided in this embodiment includes but is not limited to: Global system for mobile communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), time division duplex-Long Term Evolution (TDD LTE), Frequency Division Duplex-Long Term Evolution (FDD LTE), Long Term Evolution-enhanced (LTE-advanced), personal handy-phone system (PHS), Wi-Fi, Worldwide Interoperability for Microwave Access (WiMAX), and various future evolved wireless communications systems.

The terminal device 102 may be a wireless terminal. The wireless terminal may refer to a device that provides a user with voice and/or data connectivity, a handheld device with a radio connection function, or another processing device connected to a radio modem. The wireless terminal may communicate with one or more core networks through a radio access network (for example, a RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile terminal (mobile), a remote station, an access point, a remote terminal, an access terminal, a user terminal, a user agent, a user device, or user equipment.

The network device 101 sends a system message in a cell (for example, a cellular cell), where the system message may include correspondence information between a coverage range level and an access resource interval period. At least one terminal device 102 may receive the system message sent by the network device 101.

In addition, the at least one terminal device 102 may send an access request to the network device 101. The network device 101 sends, for the access request, an access response message to the at least one terminal device 102, where the access response message may carry an access permitting identifier or a backoff access identifier.

Figure 3:
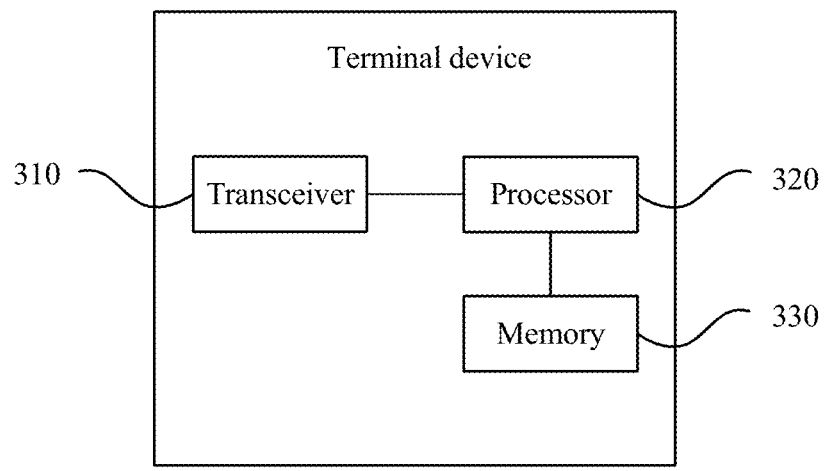
FIG. 3 is a schematic structural diagram of a terminal device according to an embodiment of the present application.

FIG. 3 is a schematic structural diagram of a terminal device 102 according to an embodiment of the present application. The terminal device 102 may include a transceiver 310, a processor 320, and a memory 330. The transceiver 310 and the memory 330 may be separately connected to the processor 320, as shown in FIG. 3. The transceiver 310 may be configured to send and receive messages or data, and the transceiver 310 may include but is not limited to an antenna, at least one amplifier, a tuner, one or more oscillators, a coupler, an LNA (low noise amplifier), and a diplexer. The processor 320 may be a control center of the terminal device 102, and connects various parts of an entire server by using various interfaces and cables. The processor 320 performs, by running or executing a software program and/or a module that are/is stored in the memory 330 and by invoking data stored in the memory 330, various functions of the server, and processes data, so as to perform overall monitoring on the terminal device 102. The processor 320 may include one or more processing units. The processor 320 may be a general purpose processor, including a central processing unit (CPU), a network processor (NP), and the like; or may be a digital signal processor (DSP), an application-specific integrated circuit (ASIC), a field programmable gate array (FPGA), another programmable logic component, or the like. The memory 330 may be configured to store a program. Specifically, the program may include program code, where the program code includes a computer operation instruction. The memory 330 may include a RAM, and may further include a non-volatile memory (non-volatile memory) such as at least one magnetic disk memory. The processor 320 executes the program code stored in the memory 330 to implement various functions.

In this embodiment, a communication message includes any signal that may be transmitted such as data and a sequence signal, and the communication message may be an access probe signal preamble.

Figure 4:
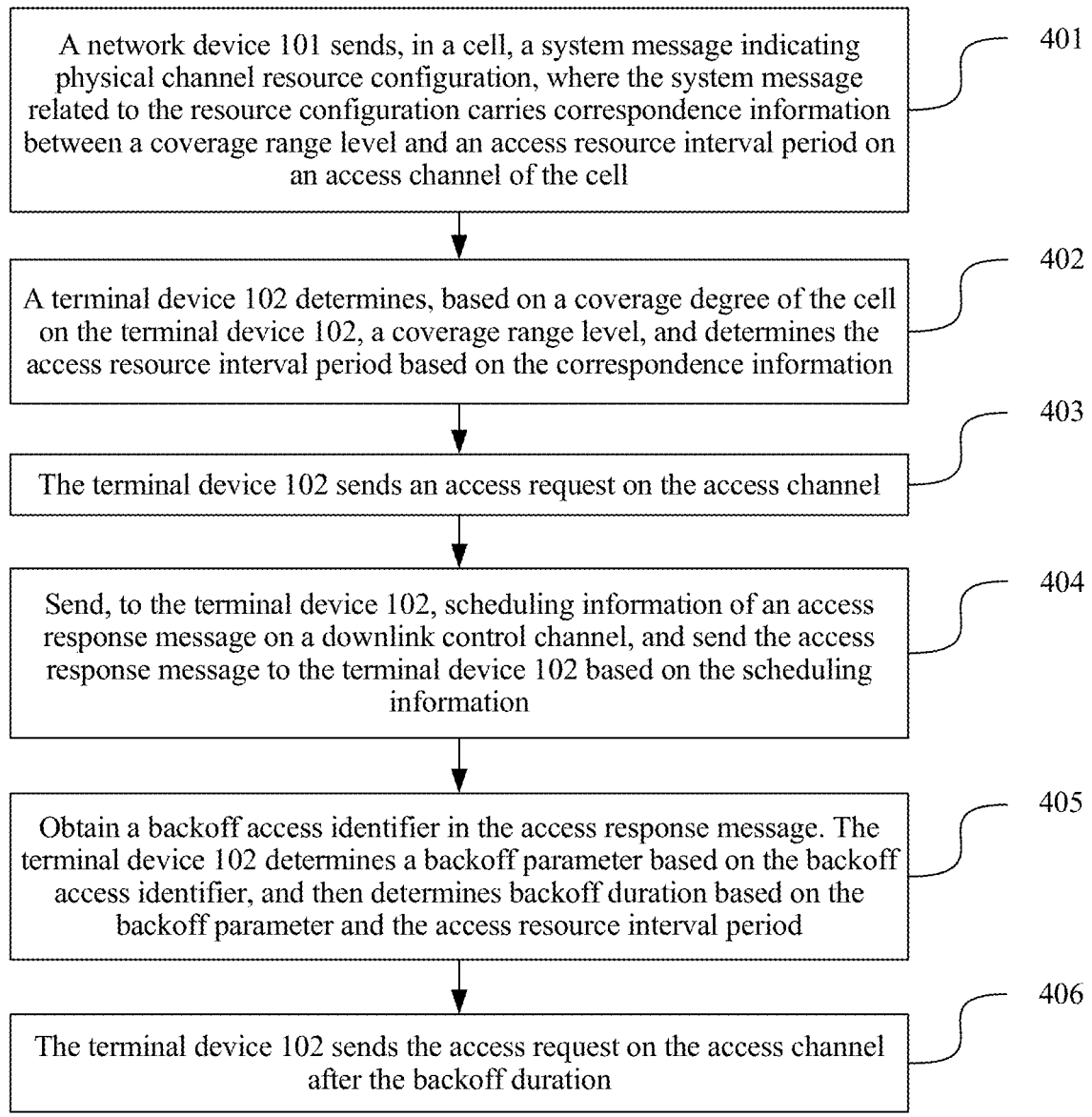
FIG. 4 is a flowchart of a communication message sending method according to an embodiment of the present application.

As shown in FIG. 4, a procedure of sending the communication message provided in this embodiment may include the following steps.

S401. A network device 101 sends, in a cell, a system message indicating physical channel resource configuration, where the system message related to the resource configuration carries correspondence information between a coverage range level and an access resource interval period on an access channel of the cell, and the correspondence information is related to determining backoff duration.

The resource interval period may be a sending period used by a terminal device 102 to send an access request.

In implementation, the system message may be sent in a form of broadcast. After receiving the correspondence information, the terminal device 102 may store the correspondence information for subsequent processing.

S402. After receiving the system message indicating the physical channel resource configuration, the terminal device 102 obtains the correspondence information between the coverage range level and the access resource interval period in the system message. The terminal device 102 determines, based on a coverage degree of the cell on the terminal device 102, a coverage range level, and determines the access resource interval period based on the correspondence information.

S403. The terminal device 102 sends an access request on the access channel.

S404. After receiving the access request sent by the terminal device 102 on the access channel, the network device 101 sends, to the terminal device 102, scheduling information of an access response message on a downlink control channel, and sends the access response message to the terminal device 102 based on the scheduling information, where the access response message includes a backoff access identifier.

S405. After receiving the access response message, the terminal device 102 obtains the backoff access identifier in the access response message. The terminal device 102 determines a backoff parameter based on the backoff access identifier, and then determines the backoff duration based on the backoff parameter and the access resource interval period.

In implementation, the terminal device 102 may pre-store a correspondence between the backoff access identifier and the backoff parameter. The correspondence may be stored in a form of a correspondence table, and the correspondence table may be as follows:

| BI Index | Backoff Parameter Value |
|---|---|
| 0 | X0 |
| 1 | X1 |
| 2 | X2 |
| 3 | X3 |
| 4 | X4 |
| 5 | X5 |
| 6 | X6 |
| 7 | X7 |
| 8 | X8 |

The BI may be the backoff access identifier, and each of X0, X1 . . . may be the backoff parameter corresponding to the backoff access identifier. The backoff parameter may be a multiple of the access resource interval period. For example, X1 may indicate that a multiple of the access resource interval period is 1, and X8 may indicate that a multiple of the access resource interval period is 8. The terminal device 102 may multiply the backoff parameter by the resource interval period corresponding to the terminal device 102 to obtain backoff duration of the terminal device 102. A specific processing manner is:

The backoff duration is determined based on a formula (1), and the formula (1) is:

$$\text{Backoff\_Time} = [0, \text{Backoff\_Value}] * \text{Period}_{CEL}, \text{ where}$$

Backoff_Time represents the backoff duration, any value selected from [0, Backoff_Value] is the backoff parameter, and $\text{Period}_{CEL}$ represents the access resource interval period corresponding to the coverage range level of the terminal device.

S406. The terminal device 102 sends the access request on the access channel after the backoff duration.

In implementation, the terminal device 102 may send the access request on the access channel after the backoff duration and when the resource interval period is reached.

In implementing backoff control on the terminal device 102, the backoff duration is determined based on the backoff access identifier indicated by the network device 101 and the access resource interval period of the terminal device 102. The access resource interval period of the terminal device 102 is related to the coverage range level of the terminal device 102, and therefore, backoff durations obtained by terminal devices 102 of different coverage range levels based on the same backoff access identifier are different. This avoids a problem in which the network device 101 cannot flexibly perform the backoff control on terminal devices 102 of different coverage range levels.

The following uses the LTE system as an example, and a processing process of sending the communication message described above may be as follows:

An access process is a random access process in the LTE system, and the access channel used by the terminal is a physical random access channel PRACH.

The system message indicating resource configuration is an SIB2, and is sent by the base station in the cell. The base station configures, by using the SIB2, different PRACH resource parameters for terminals at different coverage range levels, including a PRACH resource period (that is, the foregoing access resource period). The foregoing PRACH resource period represents a minimum time interval between two available PRACH resources for a terminal device of a specific coverage range level.

The access request is an access probe signal preamble, and is sent to the base station by the terminal on an available PRACH resource. The probe signal preamble is a sequence signal in time domain.

The access response message is a random access response protocol data unit (RAR PDU), and the base station may combine random access response messages for a plurality of terminal devices into one RAR PDU for sending. When sending the RAR PDU, the base station first sends scheduling information of the RAR PDU in the PDCCH, and then sends the RAR PDU on a corresponding scheduling location on the PDSCH. If the base station needs to control the terminal to perform backoff access for reasons such as cell overload, the base station may provide a backoff instruction by using the RAR PDU.

An access backoff identifier is BI, and a value of each BI is corresponding to one backoff parameter. In the LTE system, a unit of the backoff parameter is millisecond, that is, an absolute time. The unit used in this application is the foregoing PRACH period.

The reason for using the PRACH resource period as a unit for backoff is: PRACH resource periods configured by the base station for terminals at different coverage range levels are different because of different transmission performance. When the PPACH period is used as a unit for backoff, for a same BI instruction, a terminal of a higher coverage range level has longer backoff duration, and a terminal of a lower coverage range level has shorter backoff duration. This may achieve an objective of flexibly performing the backoff control on terminals of different coverage range levels, and avoids a problem that when the absolute time is used as a unit, backoff control effects of some backoff parameters are relatively poor for terminals of some coverage range levels.

In addition, this embodiment provides a processing process in which an access request preamble is sent on the PRACH, and the backoff duration is calculated by using the BI and an access resource interval period corresponding to a current coverage range level of the terminal, so as to perform backoff processing. The processing process may be as follows:

Step 1: The base station sends an SIB2 in the cell, where the SIB2 includes related parameters that are used by the base station to perform PRACH resource configuration for terminals at different coverage range levels and that include PRACH periods corresponding to different coverage range levels.

Step 2: After receiving the SIB2, the base station obtains the related parameters about the PRACH resource configuration. The terminal determines a coverage range level of the terminal based on a coverage degree of the cell on the terminal, and determines a PRACH period of the coverage range level based on the related PRACH configuration parameters in the SIB2.

Step 3: The terminal sends the preamble on the PRACH to indicate, to the base station, that the terminal needs to perform random access.

Step 4: After receiving the preamble sent by the terminal on the PRACH, the base station sends the scheduling information of the RAR PDU to the terminal on the PDCCH, and sends the RAR PDU to the terminal at the corresponding scheduling resource location on the PDSCH, where the PAR PDU includes the BI.

Step 5: After receiving the RAR PDU, the terminal obtains the BI in the RAR PDU. The terminal determines the backoff parameter based on the BI, and then determines the backoff duration based on the backoff parameter and the access resource interval period.

The backoff duration is determined based on a formula (1), and the formula (1) is:

Backoff_Time=[0,Backoff_Value]*Period$_{CEL}$, where

Backoff_Time represents the backoff duration, any value selected from [0, Backoff_Value] is the backoff parameter, and Period$_{CEL}$ represents the PRACH period corresponding to the coverage range level of the terminal.

Step 6: After the backoff duration, the terminal re-sends the preamble on the PRACH to request access to the cell.

It should be rioted that, in the foregoing process, it may be implemented that the base station flexibly performs the backoff control on terminals at different coverage range levels in a network or a cell that supports a plurality of coverage range levels. However, this embodiment may also be applicable to a network and a cell that supports only a single common coverage range level. This provides another optimization access method, and may effectively adapt to transmission performance in a terminal device access process by performing the backoff control with reference to the access resource period.

In this embodiment of the present application, the terminal device sends an access request to a cell to which the terminal device belongs; the terminal device listens to a downlink control channel, and receives, based on scheduling information on the downlink control channel, an access response message; if the access response message carries a backoff access identifier, the terminal device determines, based on a correspondence that is pre-stored and that is between the backoff access identifier and a backoff parameter, the backoff parameter corresponding to the backoff access identifier in the access response message; the terminal device determines, based on the backoff parameter and an access resource interval period corresponding to the terminal device, backoff duration; and the terminal device re-sends an access request to the cell after the backoff duration. In this way, the backoff duration may be determined based on the access resource interval period corresponding to the terminal device, and backoff access from each terminal may be effectively controlled, thereby improving flexibility of load control.

Figure 5:
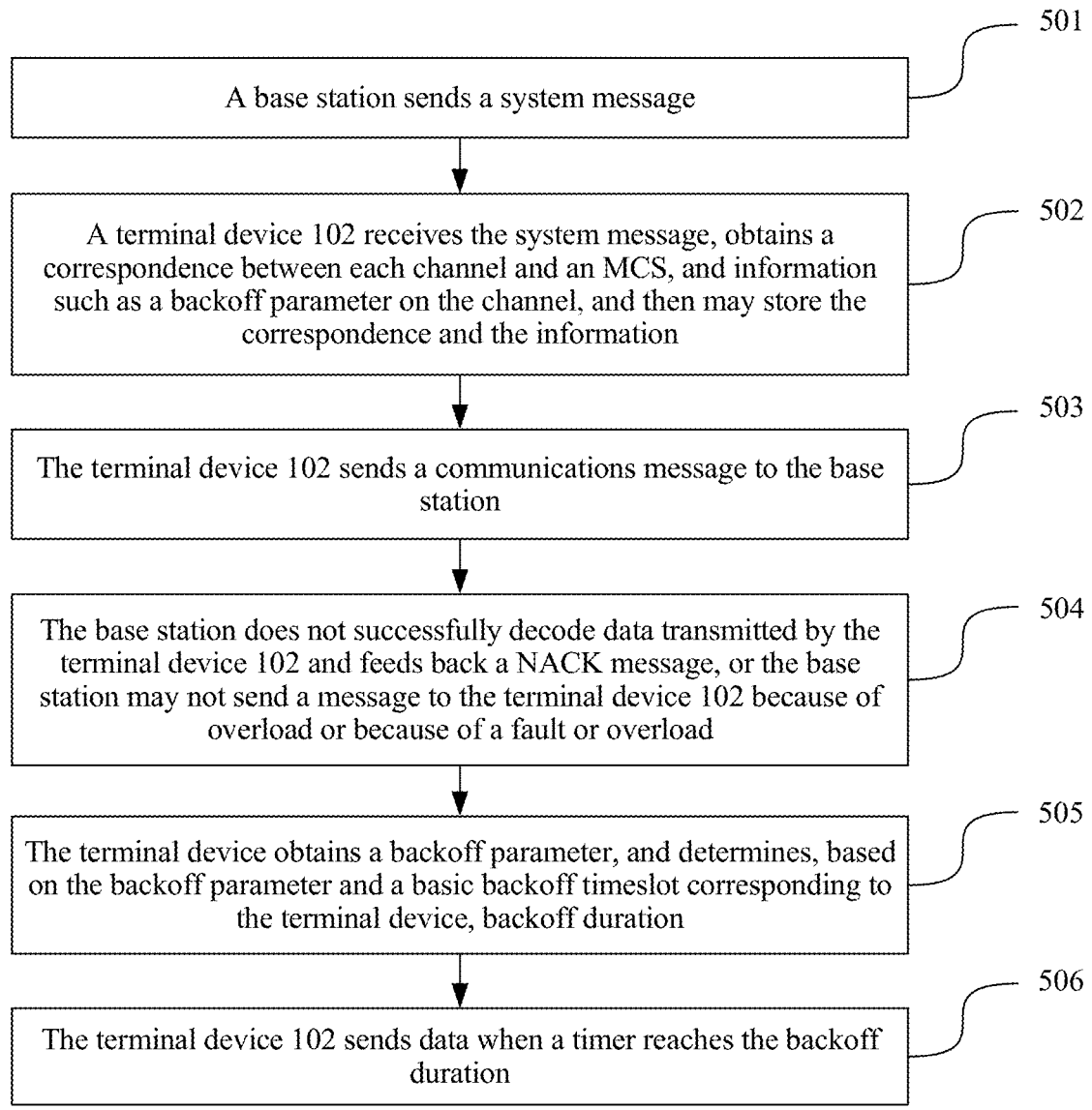
FIG. 5 is a flowchart of a communication message sending method according to an embodiment of the present application.

This embodiment further provides a communication message sending method. The method may be applied to an unlicensed spectrum in the foregoing wireless communications system. For the system, reference may be made to the foregoing description. Referring to FIG. 1, FIG. 1 is a block diagram of a communication message sending system according to an embodiment of the present application. Information transmission between a terminal device and a base station is used as an example for description in this embodiment. Other cases are similar to the case described herein, and details are not described herein again. As shown in FIG. 5, a specific processing process of the method may be as follows:

S501. The base station sends a system message.

The base station may send, in a form of broadcast, the system message to the terminal device. The system message may carry a correspondence between each channel and an MCS and a backoff parameter on each channel. The backoff parameter may be a multiple of a basic backoff timeslot. In addition, the system message may include a basic backoff timeslot corresponding to each MCS, retransmission times of each data packet, and the like. Alternatively, the system message may carry a correspondence between a coverage range level and the basic backoff timeslot.

Each channel may be corresponding to one MCS, or may be corresponding to a plurality of MCSs.

S502. A terminal device 102 receives the system message, obtains a correspondence between each channel and an MCS, and information such, as a backoff parameter on the channel, and then may store the correspondence and the information.

The terminal device 102 determines to transmit data on a corresponding channel based on the MCS selected by the terminal device 102.

S503. The terminal device 102 sends a communication message to the base station.

The communication message may be an access request, or may be a data transmission request.

S504. The base station does not successfully decode data transmitted by the terminal device 102 and feeds back a NACK message, or the base station may not send a message to the terminal device 102 because of overload or because of a fault or overload.

S505. If the terminal device does not receive, in preset duration after the communication message is sent, a response message sent by a cell, or the terminal device receives a response message that carries a backoff transmission identifier and that is sent by the cell, the terminal device obtains a backoff parameter, and determines, based on the backoff parameter and a basic backoff timeslot corresponding to the terminal device, backoff duration.

In implementation, if the terminal device does not receive, in the preset duration after the communication message is sent, the response message sent by the cell, or the terminal device receives the response message that carries the backoff transmission identifier and that is sent by the cell, the terminal may determine that backoff processing needs to be performed. The terminal device 102 determines, based on a correspondence that is pre-stored and that is between each channel and the basic backoff timeslot, a basic backoff timeslot corresponding to a to-be-used first channel. For any channel, if the channel is corresponding to one MCS, a basic backoff timeslot of the MCS is used as a basic backoff timeslot corresponding to the channel; or if the channel is corresponding to a plurality of MCSs, a maximum basic backoff timeslot of basic backoff timeslots corresponding to the plurality of MCSs is used as the basic backoff timeslot corresponding to the channel.

The basic backoff timeslot indicates a minimum duration unit when the terminal device 102 performs backoff.

In addition, the terminal device 102 may store a backoff window, and the backoff window may also be referred to as a contention window. The backoff window may be a value range, and each value included in the value range may be used as the backoff parameter. The backoff parameter may be a multiple of the basic backoff timeslot. The terminal device 102 may generate a positive integer N that is not greater than the backoff window. The backoff window may be equal to a backoff initial window, or may be equal to a product obtained by multiplying the backoff initial window by a quantity of times of sending a data packet. Backoff initial windows corresponding to different MCSs or different coverage range levels may be the same, or may be different. If backoff initial windows corresponding to coverage range levels are different, the foregoing system message may carry a correspondence between the coverage range level and the backoff initial window. The terminal device 102 may randomly select a value in the backoff window as the backoff parameter, and a calculation manner of the backoff duration may be as follows:

Backoff_Time=[0,CW_CH]*basic backoff timeslot, where

Backoff_Time represents the backoff duration, any value selected from [0, CW_CH] is the backoff parameter, and the basic backoff timeslot represents the basic backoff timeslot corresponding to the to-be-used first channel.

Figure 6:
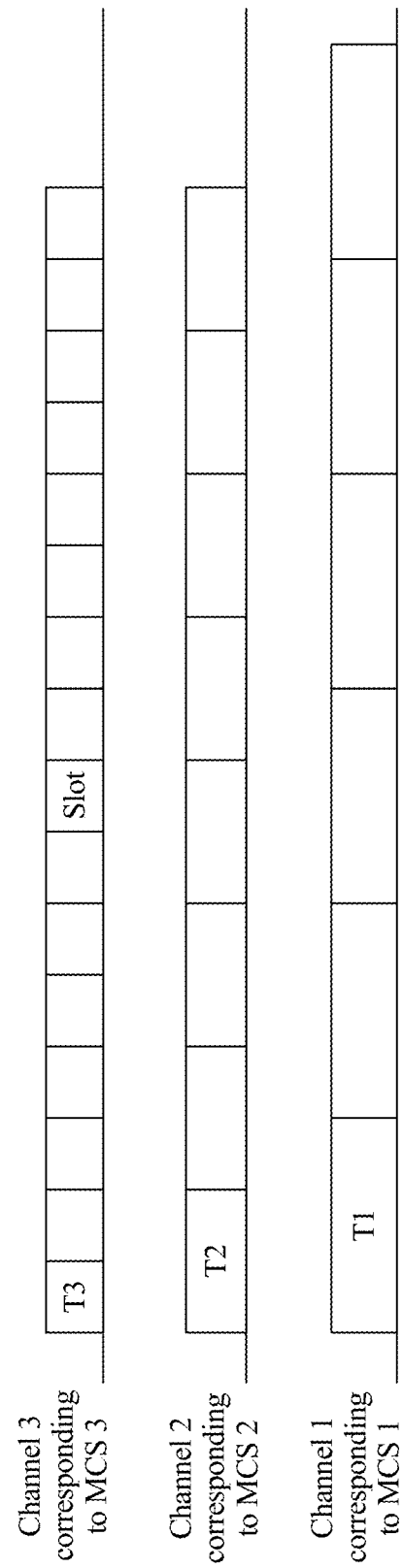
FIG. 6 is a schematic diagram of a channel according to an embodiment of the present application.

For a channel that is distinguished by using frequency domain, a length of the basic backoff timeslot may be an integer quantity of basic timeslots of transmission duration of a typical data packet. It is assumed that a length of a basic timeslot in a frame structure of a physical layer is 5 ms, and a rate of the physical layer at the coverage range level or in the MCS is 100 bps, and a length of the typical data packet is 100 bytes. In an FDD system, a length of the basic backoff timeslot may be calculated as follows: 100*8/100*5 ms=40 ms. In a TDD system, a length of a downlink timeslot between two uplink basic backoff timeslots should be considered in backoff. Referring to FIG. 6, FIG. 6 is a schematic diagram of a mapping relationship between an MCS and a channel. Frequency domain resources occupied by different channels are different. The basic backoff timeslot on the channel for backoff is equal to a result of dividing the conventional packet length by the physical layer rate or a size of one conventional physical PDU (protocol data unit, physical layer). For a channel 1, a channel 2, and a channel 3, basic time units of backoff are respectively T1, T2, and T3.

Figure 7:
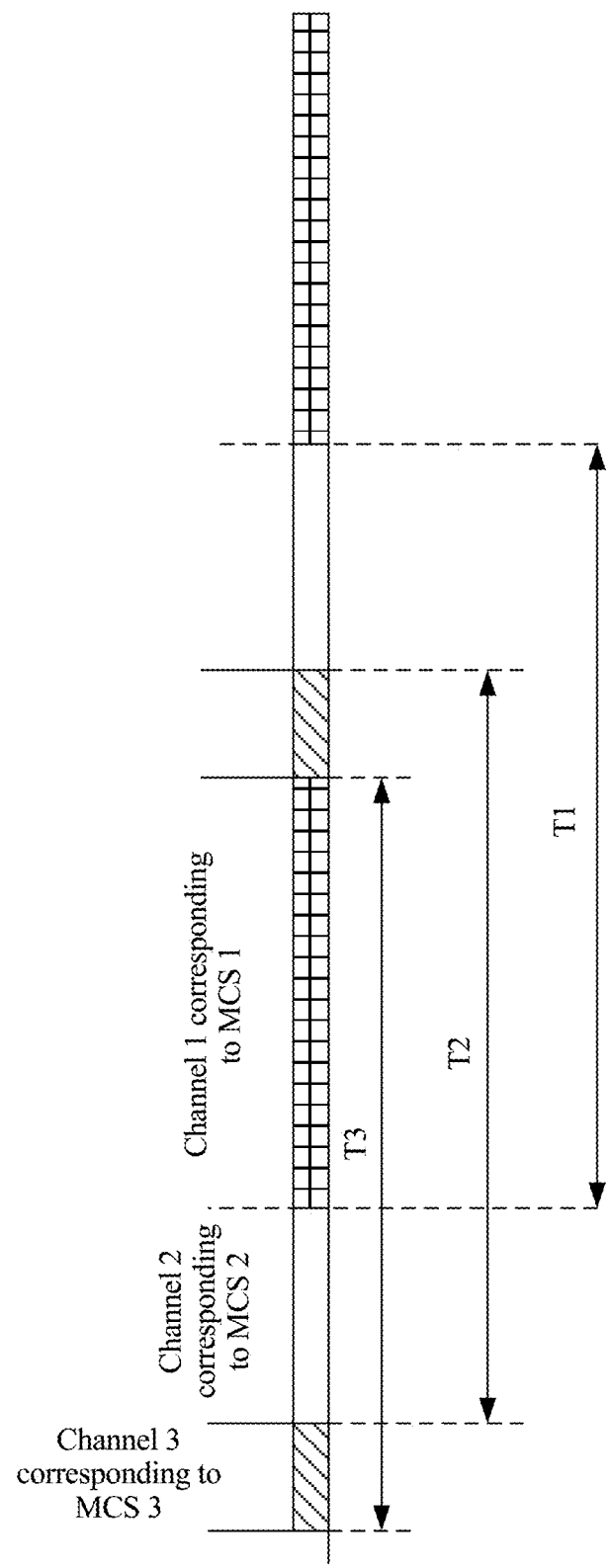
FIG. 7 is a schematic diagram of a channel according to an embodiment of the present application.

For a channel that is distinguished by using time domain, the basic backoff timeslot may be an emergence period of a channel corresponding to each coverage range level or MCS in time domain. Referring to FIG. 7, FIG. 7 is a schematic diagram of a mapping relationship between an MCS and a channel. Each MCS is corresponding to a unique channel. Time domain resources occupied by different channels are different. A basic time unit of backoff on the channel is equal to an emergence period of a channel, that is, a time interval between two adjacent channels. For a channel 1, a channel 2, and a channel 3, basic time units of backoff are respectively T1, T2, and T3.

The terminal device 102 may start a timer after calculating the backoff duration.

S506. The terminal device 102 sends data when a timer reaches the backoff duration.

In the prior art, if the terminal device determines that backoff processing needs to be performed, the terminal device may obtain the backoff parameter pre-stored and the basic backoff timeslot, and then multiply the backoff parameter by the basic backoff timeslot to obtain the backoff duration. In the prior art, basic backoff timeslots of different terminal devices are the same, and therefore, backoff duration calculated by different terminal devices may be the same. This may easily cause an overlapping part in data packet sending or resource waste.

However, in this embodiment of the present application, the terminal device sends the communication message to the cell to which the terminal device belongs; if the terminal device does not receive, in the preset duration after the communication message is sent, the response message sent by the cell, or the terminal device receives the response message that carries the backoff transmission identifier and that is sent by the cell, the terminal device obtains the backoff parameter, and determines, based on the backoff parameter and the basic backoff timeslot corresponding to the terminal device, the backoff duration; and the terminal device re-sends the access request to the cell after the backoff duration. In this way, the backoff duration may be determined based on the basic backoff timeslot corresponding to the terminal device. This may effectively avoid a case of same backoff duration of the terminal device, thereby avoiding an overlapping part in data packet sending or resource waste that may easily occur.

Erased on a same technical conception, an embodiment of the present application further provides a terminal device. As shown in FIG. 3, the terminal device provided in this embodiment may implement a procedure of the embodiment shown in FIG. 4 of the present application. The terminal device includes a transceiver 310, a processor 320, and a memory 330, where:

the transceiver 310 is configured to send an access request to a cell to which the transceiver 310 belongs;

the processor 320 is configured to: listen to a downlink control channel, and control, based on scheduling information on the downlink control channel, the transceiver 310 to receive an access response message;

the processor 320 is configured to: if the access response message carries a backoff access identifier, determine, based on a correspondence that is pre-stored in the memory 330 and that is between the backoff access identifier and a backoff parameter, the backoff parameter corresponding to the backoff access identifier in the access response message;

the processor 320 is configured to determine backoff duration based on the backoff parameter and an access resource interval period corresponding to the terminal device; and the transceiver 310 is configured to re-send an access request to the cell after the backoff duration.

The resource interval period may indicate a minimum time interval of an access resource that is available for the terminal device to send the access requests twice on the access channel, that is, a sending period used by the terminal device to send the access request. The backoff parameter may be a multiple of the access resource interval period.

The transceiver 310 may be configured to send the access request to the cell to which the transceiver 310 belongs. The memory 330 may pre-store the correspondence between the backoff access identifier and the backoff parameter. The processor 320 may search the correspondence for the backoff parameter corresponding to the received backoff access identifier, and then may multiply the backoff parameter by the resource interval period corresponding to the terminal device to obtain the backoff duration of the terminal device.

Optionally, the processor 320 is further configured to:

before determining the backoff duration based on the backoff parameter and the access resource interval period corresponding to the terminal device, determine, based on a coverage degree of the cell on the terminal device, a coverage range level of the terminal device, and determine an access resource interval period that is on an access channel of the cell and that is corresponding to the coverage range level of the terminal device; where the access resource interval period indicates a minimum time interval of an access resource that is available for the terminal device to send the access requests twice on the access channel; and correspondence information between the coverage range level and the access resource interval period is included in a system message indicating physical channel resource configuration in the cell, and is sent by the cell to the terminal device.

The cell (for example, a cellular cell) may send, in a form of broadcast, the system message indicating the physical channel resource configuration to the terminal device. The system message may carry the correspondence information between the coverage range level and the access resource interval period. The processor 320 may detect the coverage degree of the cell on the terminal device, determine the coverage range level of the terminal device based on the coverage degree, and search the foregoing correspondence for the access resource interval period corresponding to the coverage range level of the terminal device.

Optionally, the processor 320 is specifically configured to:

Backoff_Time=[0,Backoff_Value]*Period$_{CEL}$, where

Backoff_Time represents the backoff duration, any value selected from [0, Backoff_Value] is the backoff parameter, and Period$_{CEL}$ represents the access resource interval period corresponding to the coverage range level of the terminal device.

In this embodiment of the present application, the terminal device sends an access request to a cell to which the terminal device belongs; the terminal device listens to a downlink control channel, and receives, based on scheduling information on the downlink control channel, an access response message; if the access response message carries a backoff access identifier, the terminal device determines, based on a correspondence that is pre-stored and that is between the backoff access identifier and a backoff parameter, the backoff parameter corresponding to the backoff access identifier in the access response message; the terminal device determines, based on the backoff parameter and an access resource interval period corresponding to the terminal device, backoff duration; and the terminal device re-sends an access request to the cell after the backoff duration. In this way, the backoff duration may be determined based on the access resource interval period corresponding to the terminal device, and backoff access from each terminal may be effectively controlled, thereby improving flexibility of load control.

Based on a same technical conception, an embodiment of the present application further provides a terminal device. As shown in FIG. 3, the terminal device provided in this embodiment may implement a procedure of the embodiment shown in FIG. 4 of the present application. The terminal device includes a transceiver 310 and a processor 320, where:

the transceiver 310 is configured to send a communication message to a cell to which the transceiver 310 belongs;

the processor 320 is configured to: if the transceiver 310 does not receive, in preset duration after the communication message is sent, a response message sent by the cell, or the transceiver 310 receives a response message that carries a backoff transmission identifier and that is sent by the cell, obtain a backoff parameter, and determine, based on the backoff parameter and a basic backoff timeslot corresponding to the terminal device, backoff duration; and the transceiver 310 is configured to re-send an access request to the cell after the backoff duration.

The backoff parameter may be a multiple of the basic backoff timeslot. A memory 330 may store a backoff window, and the backoff window may also be referred to as a contention window. The backoff window may be a value range, and each value included in the value range may be used as the backoff parameter. The backoff parameter may be a multiple of the basic backoff timeslot. The terminal device may generate a positive integer N that is not greater than the backoff window. The backoff window may be equal to a backoff initial window, or may be equal to a product obtained by multiplying the backoff initial window by a quantity of times of sending a data packet. Backoff initial windows corresponding to different MCSs or different coverage range levels may be the same, or may be different. If backoff initial windows corresponding to coverage range levels are different, the foregoing system message may carry a correspondence between the coverage range level and the backoff initial window. The processor 320 may randomly select a value in the backoff window as the backoff parameter.

Optionally, the terminal device further includes the memory 330, and the processor 320 is further configured to:

before the determining, based on the backoff parameter and a basic backoff timeslot corresponding to the terminal device, backoff duration, determine, based on a correspondence that is pre-stored in the memory 330 and that is between each channel and the basic backoff timeslot, a basic backoff timeslot corresponding to a to-be-used first channel; where the basic backoff timeslot indicates a minimum duration unit when the terminal device pier forms backoff.

the basic backoff timeslot indicates a minimum duration unit when the terminal device performs backoff.

The base station may send, in a form of broadcast, the system message to the terminal device. The system message may carry a correspondence between each channel and the MCS and a backoff parameter on each channel. The backoff parameter may be a multiple of the basic backoff timeslot. In addition, the system message may include a basic backoff timeslot corresponding to each MCS, retransmission times of each data packet, and the like. Alternatively, the system message may carry a correspondence between the coverage range level and the basic backoff timeslot. The processor 320 may determine a coverage range level corresponding to the processor 320, and use a basic backoff timeslot corresponding to the coverage range level as a basic backoff timeslot of the terminal device.

For any channel, if the channel is corresponding to one MCS, the processor 320 may use a basic backoff timeslot of the MCS as a basic backoff timeslot corresponding to the channel; or if the channel is corresponding to a plurality of MCSs, the processor 320 may use a maximum basic backoff timeslot of basic backoff timeslots corresponding to the plurality of MCSs as the basic backoff timeslot corresponding to the channel.

Optionally, the processor 320 is specifically configured to:

Backoff_Time=[0,$CW\_CH$]*basic backoff timeslot, where

Backoff_Time represents the backoff duration, any value selected from [0, CW_CH] is the backoff parameter, and the basic backoff timeslot represents the basic backoff timeslot corresponding to the to-be-used first channel.

In the prior art, if the terminal device determines that backoff processing needs to be performed, the terminal device may obtain the backoff parameter pre-stored and the basic backoff timeslot, and then multiply the backoff parameter by the basic backoff timeslot to obtain the backoff duration. In the prior art, basic backoff timeslots of different terminal devices are the same, and therefore, backoff duration calculated by different terminal devices may be the same. This may easily cause an overlapping part in data packet sending or resource waste.

However, in this embodiment of the present application, the terminal device sends the communication message to the cell to which the terminal device belongs; if the terminal device does not receive, in the preset duration after the communication message is sent, the response message sent by the cell, or the terminal device receives the response message that carries the backoff transmission identifier and that is sent by the cell, the terminal device obtains the backoff parameter, and determines, based on the backoff parameter and the basic backoff timeslot corresponding to the terminal device, the backoff duration; and the terminal device re-sends the access request to the cell after the backoff duration. In this way, the backoff duration may be determined based on the basic backoff timeslot corresponding to the terminal device. This may effectively avoid a case of same backoff duration of the terminal device, thereby avoiding an overlapping part in data packet sending or resource waste that may easily occur.

Figure 8:
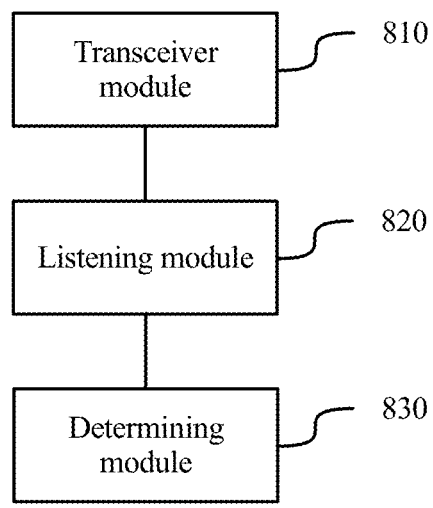
FIG. 8 is a schematic structural diagram of a terminal device according to an embodiment of the present application.

Based on a same technical conception, an embodiment of the present application further provides a terminal device. As shown in FIG. 8, the terminal device provided in this embodiment may implement a procedure of the embodiment shown in FIG. 4 of the present application. The terminal device includes:

a transceiver module 810, configured to send an access request to a cell to which the transceiver module 810 belongs;

a listening module 820, configured to: listen to a downlink control channel, and control, based on scheduling information on the downlink control channel, the transceiver module to receive an access response message; and a determining module 830, configured to: if the access response message carries a backoff access identifier, determine, based on a correspondence that is pre-stored in the memory and that is between the backoff access identifier and a backoff parameter, the backoff parameter corresponding to the backoff access identifier in the access response message; where the determining module 830 is further configured to determine backoff duration based on the backoff parameter and an access resource interval period corresponding to the terminal device; and the transceiver module 810 is further configured to re-send an access request to the cell after the backoff duration.

The resource interval period may indicate a minimum time interval of an access resource that is available for the terminal device to send the access requests twice on the access channel, that is, a sending period used by the terminal device to send the access request. The backoff parameter may be a multiple of the access resource interval period.

The determining module 830 may search the pre-stored correspondence between the backoff access identifier and the backoff parameter for the backoff parameter corresponding to the received backoff access identifier, and then may multiply the backoff parameter by the resource interval period corresponding to the terminal device to obtain the backoff duration of the terminal device. The transceiver module 810 may be implemented by using the foregoing transceiver 310, and the listening module 820 and the determining module 830 may be implemented by using the foregoing processor 320 and memory 330.

Optionally, the determining module 830 is further configured to:

before determining the backoff duration based on the backoff parameter and the access resource interval period corresponding to the terminal device, determine, based on a coverage degree of the cell on the terminal device, a coverage range level of the terminal device, and determine an access resource interval period that is on an access channel of the cell and that is corresponding to the coverage range level of the terminal device; where the access resource interval period indicates a minimum time interval of an access resource that is available for the terminal device to send the access requests twice on the access channel; and correspondence information between the coverage range level and the access resource interval period is included in a system message indicating physical channel resource configuration in the cell, and is sent by the cell to the terminal device.

The cell (for example, a cellular cell) may send, in a form of broadcast, the system message indicating the physical channel resource configuration to the terminal device. The system message may carry the correspondence information between the coverage range level and the access resource interval period. The determining module 830 may detect the coverage degree of the cell on the terminal device, determine the coverage range level of the terminal device based on the coverage degree, and search the foregoing correspondence for the access resource interval period corresponding to the coverage range level of the terminal device.

Optionally, the determining module 830 is specifically configured to:

$$\text{Backoff\_Time}=[0,\text{Backoff\_Value}]*\text{Period}_{CEL}, \text{ where}$$

Backoff_Time represents the backoff duration, any value selected from [0, Backoff_Value] is the backoff parameter, and $\text{Period}_{CEL}$ represents the access resource interval period corresponding to the coverage range level of the terminal device.

In this embodiment of the present application, the terminal device sends an access request to a cell to which the terminal device belongs; the terminal device listens to a downlink control channel, and receives, based on scheduling information on the downlink control channel, an access response message; if the access response message carries a backoff access identifier, the terminal device determines, based on a correspondence that is pre-stored and that is between the backoff access identifier and a backoff parameter, the backoff parameter corresponding to the backoff access identifier in the access response message; the terminal device determines, based on the backoff parameter and an access resource interval period corresponding to the terminal device, backoff duration; and the terminal device re-sends an access request to the cell after the backoff duration. In this way, the backoff duration may be determined based on the access resource interval period corresponding to the terminal device, and backoff access from each terminal may be effectively controlled, thereby improving flexibility of load control.

Figure 9:
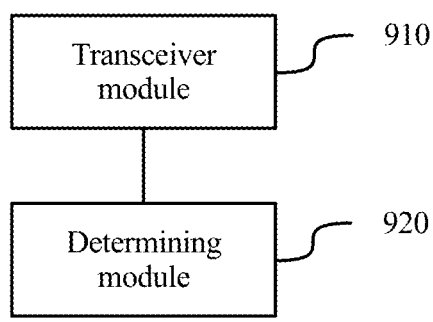
FIG. 9 is a schematic structural diagram of a terminal device according to an embodiment of the present application.

Based on a same technical conception, an embodiment of the present application further provides a terminal device. As shown in FIG. 9, the terminal device provided in this embodiment may implement a procedure of the embodiment shown in FIG. 4 of the present application. The terminal device includes:

a transceiver module 910, configured to send a communication message to a cell to which the transceiver module 910 belongs; and a determining module 920, configured to: if the transceiver module does not receive, in preset duration after the communication message is sent, a response message sent by the cell, or the transceiver receives a response message that carries a backoff transmission identifier and that is sent by the cell, obtain a backoff parameter, and determine, based on the backoff parameter and a basic backoff timeslot corresponding to the terminal device, backoff duration; where the transceiver module 910 is further configured to re-send an access request to the cell after the backoff duration.

The basic backoff timeslot indicates a minimum duration unit when the terminal device performs backoff. For a channel that is distinguished by using frequency domain, a length of the basic backoff timeslot may be an integer quantity of basic timeslots of transmission duration of a typical data packet. For a channel that is distinguished by using time domain, the basic backoff timeslot may be an emergence period of a channel corresponding to each coverage range level or MCS in time domain.

The backoff parameter may be a multiple of the basic backoff timeslot. The terminal device may store a backoff window, and the backoff window may also be referred to as a contention window. The backoff window may be a value range, and each value included in the value range may be used as the backoff parameter. The backoff parameter may be a multiple of the basic backoff timeslot. The terminal device may generate a positive integer N that is not greater than the backoff window. The backoff window may be equal to a backoff initial window, or may be equal to a product obtained by multiplying the backoff initial window by a quantity of times of sending a data packet. Backoff initial windows corresponding to different MCSs or different coverage range levels may be the same, or may be different. If backoff initial windows corresponding to coverage range levels are different, the foregoing system message may carry a correspondence between the coverage range level and the backoff initial window. The determining module 910 may randomly select a value in the backoff window as the backoff parameter. The transceiver module 910 may be implemented by using the foregoing transceiver 310, and the determining module 920 may be implemented by using the foregoing processor 320 and memory 330.

Optionally, the determining module 920 is further configured to:

before the determining, based on the backoff parameter and a basic backoff timeslot corresponding to the terminal device, backoff duration, determine, based on a correspondence that is pre-stored in the memory and that is between each channel and the basic backoff timeslot, a basic backoff timeslot corresponding to a to-be-used first channel; where the basic backoff timeslot indicates a minimum duration unit when the terminal device performs backoff.

The base station may send, in a form of broadcast, the system message to the terminal device. The system message may carry a correspondence between each channel and the MCS and a backoff parameter on each channel. The backoff parameter may be a multiple of the basic backoff timeslot. In addition, the system message may include a basic backoff timeslot corresponding to each MCS, retransmission times of each data packet, and the like. Alternatively, the system message may carry a correspondence between the coverage range level and the basic backoff timeslot. The determining module 920 may determine a coverage range level corresponding to the determining module 920, and use a basic backoff timeslot corresponding to the coverage range level as a basic backoff timeslot of the terminal device.

For any channel, if the channel is corresponding to one MCS, the determining module 920 may use a basic backoff timeslot of the MCS as a basic backoff timeslot corresponding to the channel; or if the channel is corresponding to a plurality of MCSs, the determining module 920 may use a maximum basic backoff timeslot of basic backoff timeslots corresponding to the plurality of MCSs as the basic backoff timeslot corresponding to the channel.

Optionally, the determining module 920 is specifically configured to:

$$\text{Backoff\_Time} = [0, CW\_CH] * \text{basic backoff timeslot},$$

where

Backoff_Time represents the backoff duration, any value selected from [0, CW_CH] is the backoff parameter, and the basic backoff timeslot represents the basic backoff timeslot corresponding to the to-be-used first channel.

In the prior art, if the terminal device determines that backoff processing needs to be performed, the terminal device may obtain the backoff parameter pre-stored and the basic backoff timeslot, and then multiply the backoff parameter by the basic backoff timeslot to obtain the backoff duration. In the prior art, basic backoff timeslots of different terminal devices are the same, and therefore, backoff duration calculated by different terminal devices may be the same. This may easily cause an overlapping part in data packet sending or resource waste.

However, in this embodiment of the present application, the terminal device sends the communication message to the cell to which the terminal device belongs; if the terminal device does not receive, in the preset duration after the communication message is sent, the response message sent by the cell, or the terminal device receives the response message that carries the backoff transmission identifier and that is sent by the cell, the terminal device obtains the backoff parameter, and determines, based on the backoff parameter and the basic backoff timeslot corresponding to the terminal device, the backoff duration; and the terminal device re-sends the access request to the cell after the backoff duration. In this way, the backoff duration may be determined based on the basic backoff timeslot corresponding to the terminal device. This may effectively avoid a case of same backoff duration of the terminal device, thereby avoiding an overlapping part in data packet sending or resource waste that may easily occur.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present application, but are not intended to limit the present application. Any modification, equivalent replacement, and improvement made without departing from the principle of the present application shall fall within the protection scope of the present application.

The invention claimed is:

1. A communication message sending method, comprising:

sending, by a terminal device, an access request to a cell to which the terminal device belongs;

monitoring, by the terminal device, a downlink control channel; and receiving, by the terminal device, based on scheduling information on the downlink control channel, an access response message that carries a backoff access identifier;

determining, by the terminal device, a backoff parameter based on a pre-stored correspondence between the backoff access identifier and the backoff parameter;

determining, by the terminal device, based on the backoff parameter and an access resource interval period corresponding to the terminal device, backoff duration, wherein the backoff duration is determined based on a product of the backoff parameter and the access resource interval period, wherein the access resource interval period indicates a minimum time interval of an access resource that is available for the terminal device to send the access request twice on an access channel of the cell; and sending, by the terminal device, the access request to the cell after the backoff duration.

2. The method according to claim 1, wherein before determining, by the terminal device, based on the backoff parameter and an access resource interval period corresponding to the terminal device, backoff duration, the method further comprises:

determining, by the terminal device, based on a coverage degree of the cell on the terminal device, a coverage range level of the terminal device; and determining, by the terminal device, an access resource interval period that is on an access channel of the cell and that corresponds to the coverage range level of the terminal device, wherein correspondence information between the coverage range level and the access resource interval period is comprised in a system message indicating physical channel resource configuration in the cell, and is sent by the cell to the terminal device.

3. The method according to claim 2, wherein determining, by the terminal device based on the backoff parameter and the access resource interval period, backoff duration comprises:

Backoff_Time=[0,Backoff_Value]*Period$_{CEL}$,
  wherein

Backoff_Time represents the backoff duration, any value selected from [0, Backoff_Value] is the backoff parameter, and Period$_{CEL}$ represents the access resource interval period corresponding to the coverage range level of the terminal device.

4. A communication message sending method, comprising:

sending, by a terminal device, a communication message to a cell to which the terminal device belongs;

when the terminal device does not receive, in a preset duration after the communication message is sent, a response message sent by the cell, or when the terminal device receives a response message that carries a backoff transmission identifier that is sent by the cell, obtaining, by the terminal device, a backoff parameter;

determining, based on the backoff parameter and a basic backoff timeslot corresponding to the terminal device, backoff duration, wherein the backoff duration is determined based on a product of the backoff parameter and the basic backoff timeslot, wherein the basic backoff timeslot indicates a minimum duration unit when the terminal device performs backoff; and sending, by the terminal device, an access request to the cell after the backoff duration.

5. The method according to claim 4, wherein before determining, based on the backoff parameter and a basic backoff timeslot corresponding to the terminal device, backoff duration, the method further comprises:

determining, by the terminal device, a basic backoff timeslot corresponding to a to-be-used first channel based on a pre-stored correspondence between each channel and a basic backoff timeslot.

6. The method according to claim 5, wherein determining, based on the backoff parameter and a basic backoff timeslot corresponding to the terminal device, backoff duration comprises:

Backoff_Time=[0,$CW\_CH$]*basic backoff timeslot,
  wherein

Backoff_Time represents the backoff duration, any value selected from [0, CW_CH] is the backoff parameter, and the basic backoff timeslot represents the basic backoff timeslot corresponding to the to-be-used first channel.

7. A terminal device, comprising:

a memory;

a transceiver configured to send an access request to a cell to which the transceiver belongs;

a processor configured to:

monitor a downlink control channel, and control, based on scheduling information on the downlink control channel, the transceiver to receive an access response message, when the access response message carries a backoff access identifier, determine, a backoff parameter based on a pre-stored correspondence stored in the memory and that is between the backoff access identifier and the backoff parameter, and determine backoff duration based on the backoff parameter and an access resource interval period corresponding to the terminal device, wherein the backoff duration is determined based on a product of the backoff parameter and the access resource interval period, wherein the access resource interval period indicates a minimum time interval of an access resource that is available for the terminal device to send the access request twice on an access channel of the cell; and wherein the transceiver is configured to send the access request to the cell after the backoff duration.

8. The terminal device according to claim 7, wherein the processor is further configured to:

before determining the backoff duration based on the backoff parameter and the access resource interval period corresponding to the terminal device, determine, based on a coverage degree of the cell on the terminal device, a coverage range level of the terminal device, and determine an access resource interval period that is on the access channel of the cell and that corresponds to the coverage range level of the terminal device, wherein correspondence information between the coverage range level and the access resource interval period is comprised in a system message indicating physical channel resource configuration in the cell, and is sent by the cell to the terminal device.

9. The terminal device according to claim 8, wherein to determine backoff duration, the processor is configured to:

Backoff_Time=[0,Backoff_Value]*Period$_{CEL}$,
  wherein

Backoff_Time represents the backoff duration, any value selected from [0, Backoff_Value] is the backoff parameter, and Period$_{CEL}$ represents the access resource interval period corresponding to the coverage range level of the terminal device.

10. A terminal device, comprising:

a memory;

a transceiver configured to send a communication message to a cell to which the transceiver belongs;

a processor configured to:
when the transceiver does not receive, in a preset duration after the communication message is sent, a response message sent by the cell, or when the transceiver receives a response message that carries a backoff transmission identifier and that is sent by the cell, obtain a backoff parameter, and
determine, based on the backoff parameter and a basic backoff timeslot corresponding to the terminal device, backoff duration, wherein the backoff duration is determined based on a product of the backoff parameter and the basic backoff timeslot, wherein the basic backoff timeslot indicates a minimum duration unit when the terminal device performs backoff; and
wherein the transceiver is configured to send an access request to the cell after the backoff duration.

11. The terminal device according to claim 10, wherein the processor is further configured to:
before determining, based on the backoff parameter and a basic backoff timeslot corresponding to the terminal device, backoff duration, determine a basic backoff timeslot that corresponds to a to-be-used first channel based on a pre-stored correspondence stored in the memory between each channel and a basic backoff timeslot.

12. The terminal device according to claim 11, wherein to determine backoff duration, the processor is configured to:

Backoff_Time=[0,$CW\_CH$]*basic backoff timeslot, wherein

Backoff_Time represents the backoff duration, any value selected from [0, CW_CH] is the backoff parameter, and the basic backoff timeslot represents the basic backoff timeslot corresponding to the to-be-used first channel.

13. A non-transitory computer readable medium storing program codes for use by a terminal device for sending communication messages, wherein the program codes comprise instructions which, when executed by a processor, cause the terminal device to:
send an access request to a cell to which the terminal device belongs;
monitor a downlink control channel, and receive, based on scheduling information on the downlink control channel, an access response message that carries a backoff access identifier;
determine a backoff parameter based on a pre-stored correspondence between the backoff access identifier and the backoff parameter;
determine backoff duration based on the backoff parameter and an access resource interval period corresponding to the terminal device, wherein the backoff duration is determined based on a product of the backoff parameter and the access resource interval period, wherein the access resource interval period indicates a minimum time interval of an access resource that is available for the terminal device to send the access request twice on an access channel of the cell; and
send the access request to the cell after the backoff duration.

14. A non-transitory computer readable medium storing program codes for use by a terminal device for sending communication messages, wherein the program codes comprise instructions which, when executed by a processor, cause the terminal device to:
send an access request to a cell to which the terminal device belongs;
when a transceiver of the terminal device does not receive, in a preset duration after the communication message is sent, a response message sent by the cell, or when the transceiver receives a response message that carries a backoff transmission identifier and that is sent by the cell, obtain a backoff parameter;
determine, based on the backoff parameter and a basic backoff timeslot corresponding to the terminal device, backoff duration, wherein the backoff duration is determined based on a product of the backoff parameter and the basic backoff timeslot, wherein the basic backoff timeslot indicates a minimum duration unit when the terminal device performs backoff; and
send an access request to the cell after the backoff duration.

* * * * *